(No Model.) 9 Sheets—Sheet 1.
F. A. MILLS.
SHOE SEWING MACHINE.
No. 524,336. Patented Aug. 14, 1894.
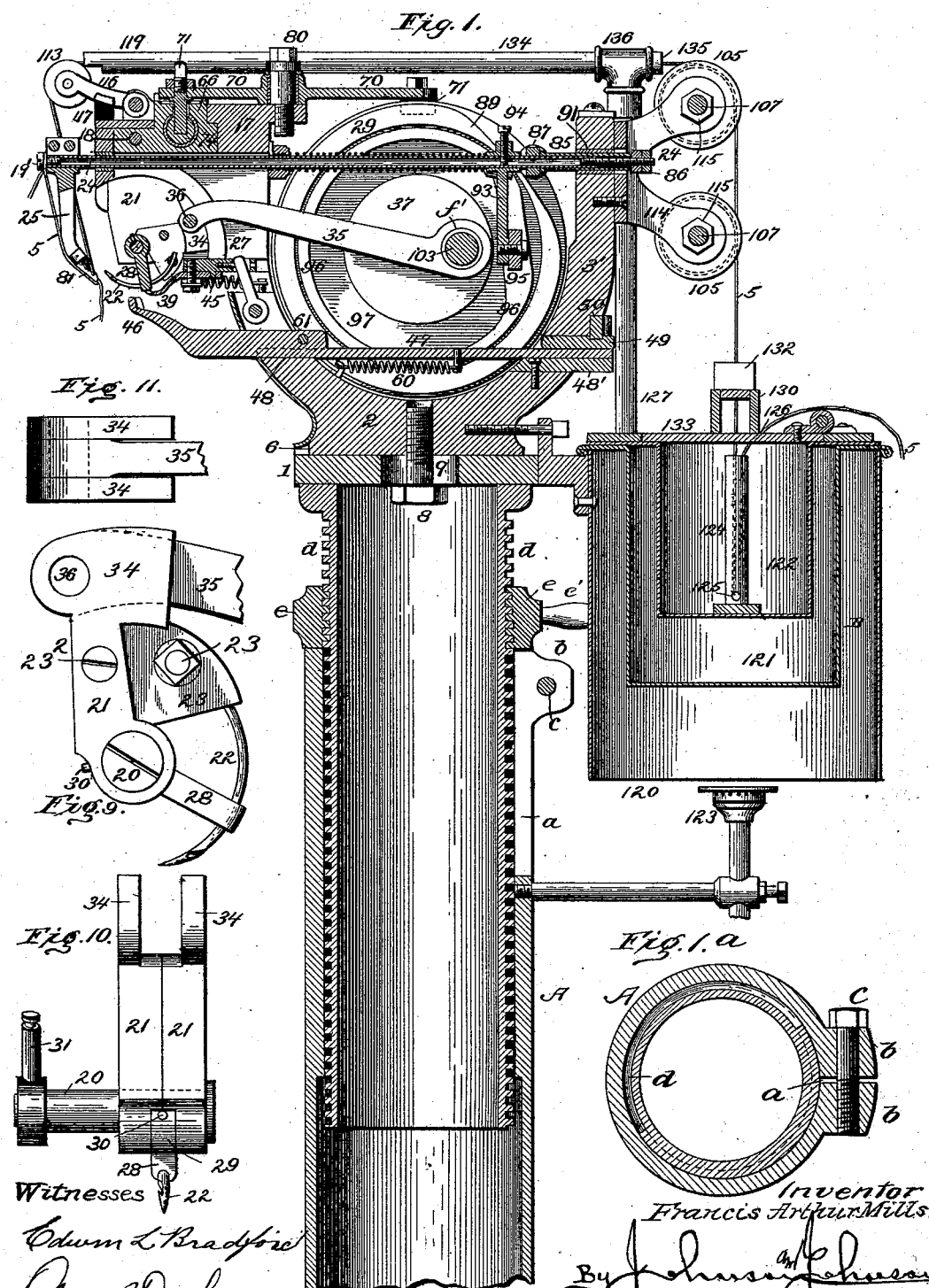
Witnesses
Edwin L. Bradford
Rudy Johnson
Inventor
Francis Arthur Mills.
By Johnson & Johnson
his Attorneys.
THE NORRIS PETERS CO., PHOTO-LITHO., WASHINGTON, D. C.

(No Model.)  9 Sheets—Sheet 2.
F. A. MILLS.
SHOE SEWING MACHINE.
No. 524,336. Patented Aug. 14, 1894.
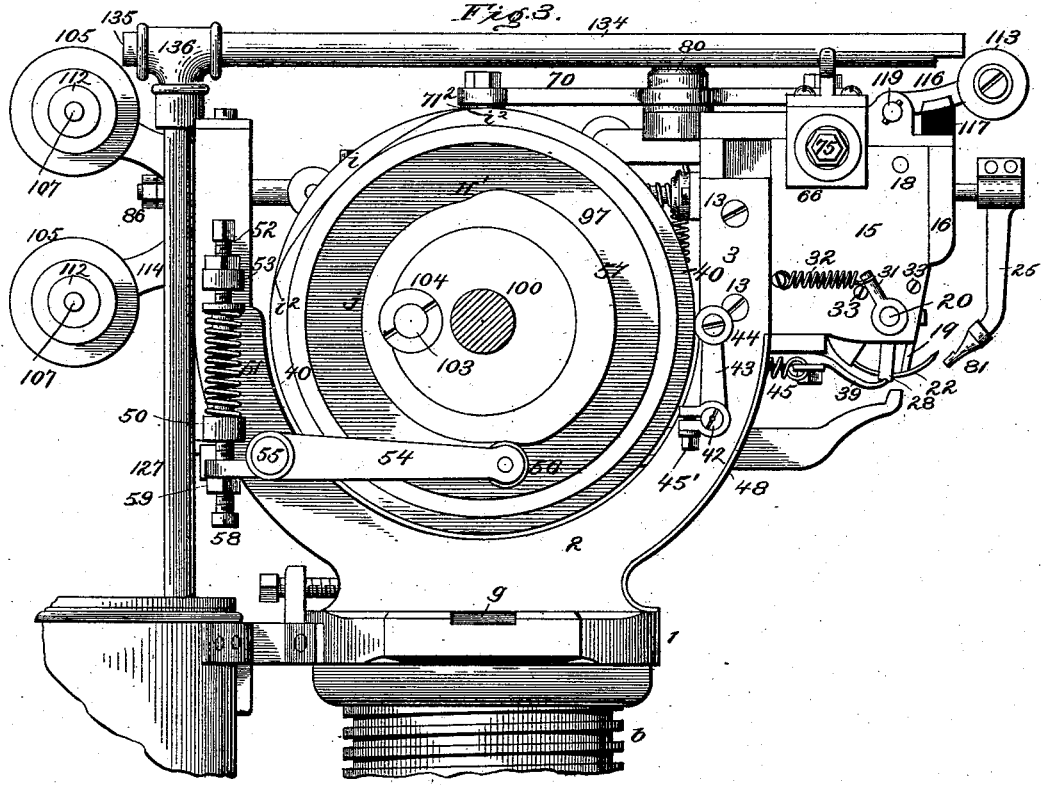
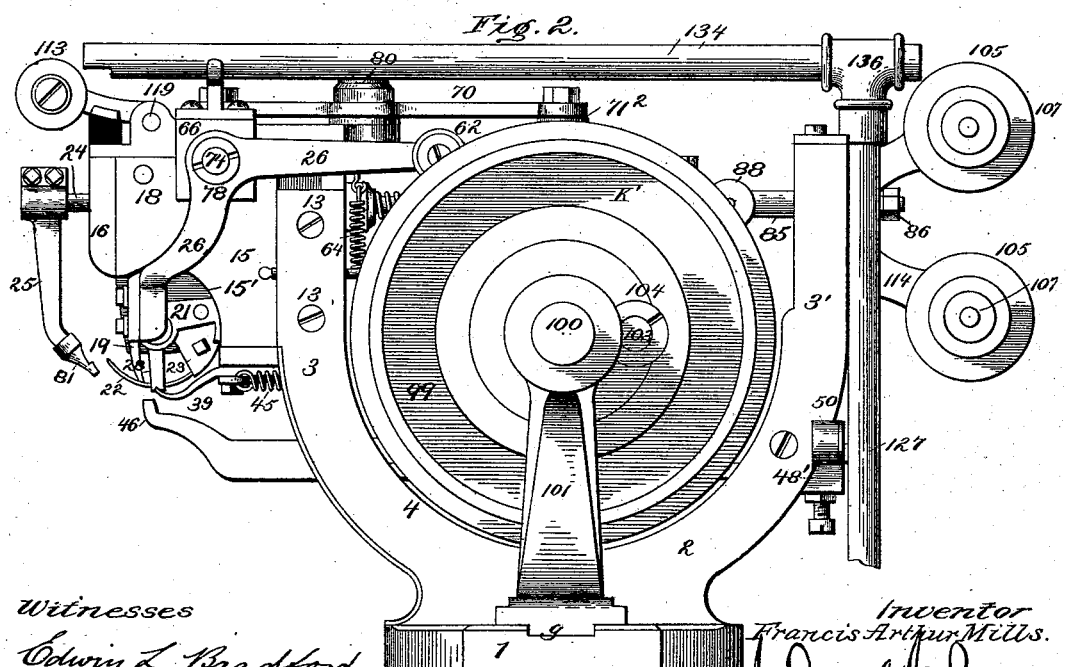
Witnesses
Edwin L. Bradford
Inventor
Francis Arthur Mills.
By Johnson & Johnson
his Attorneys

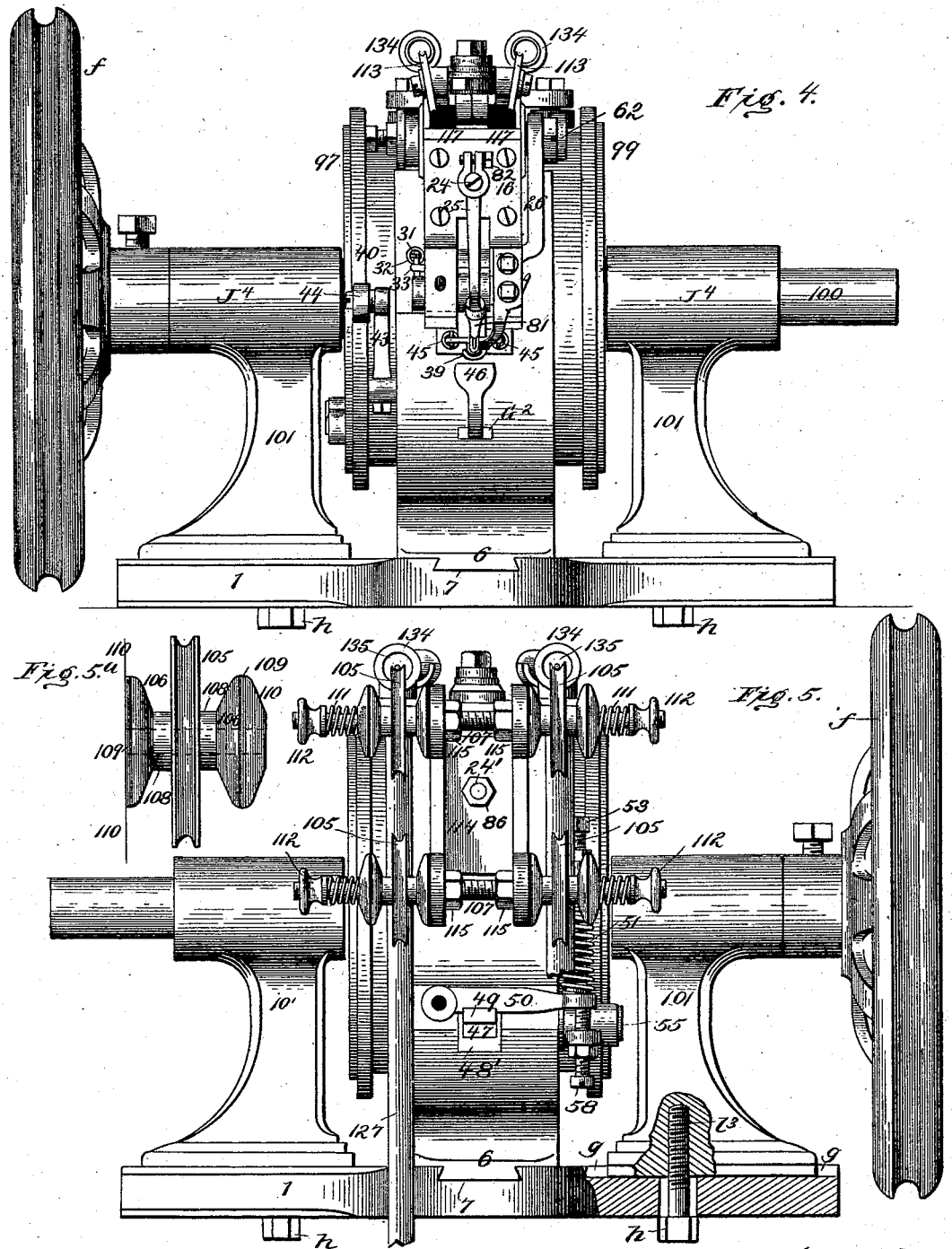

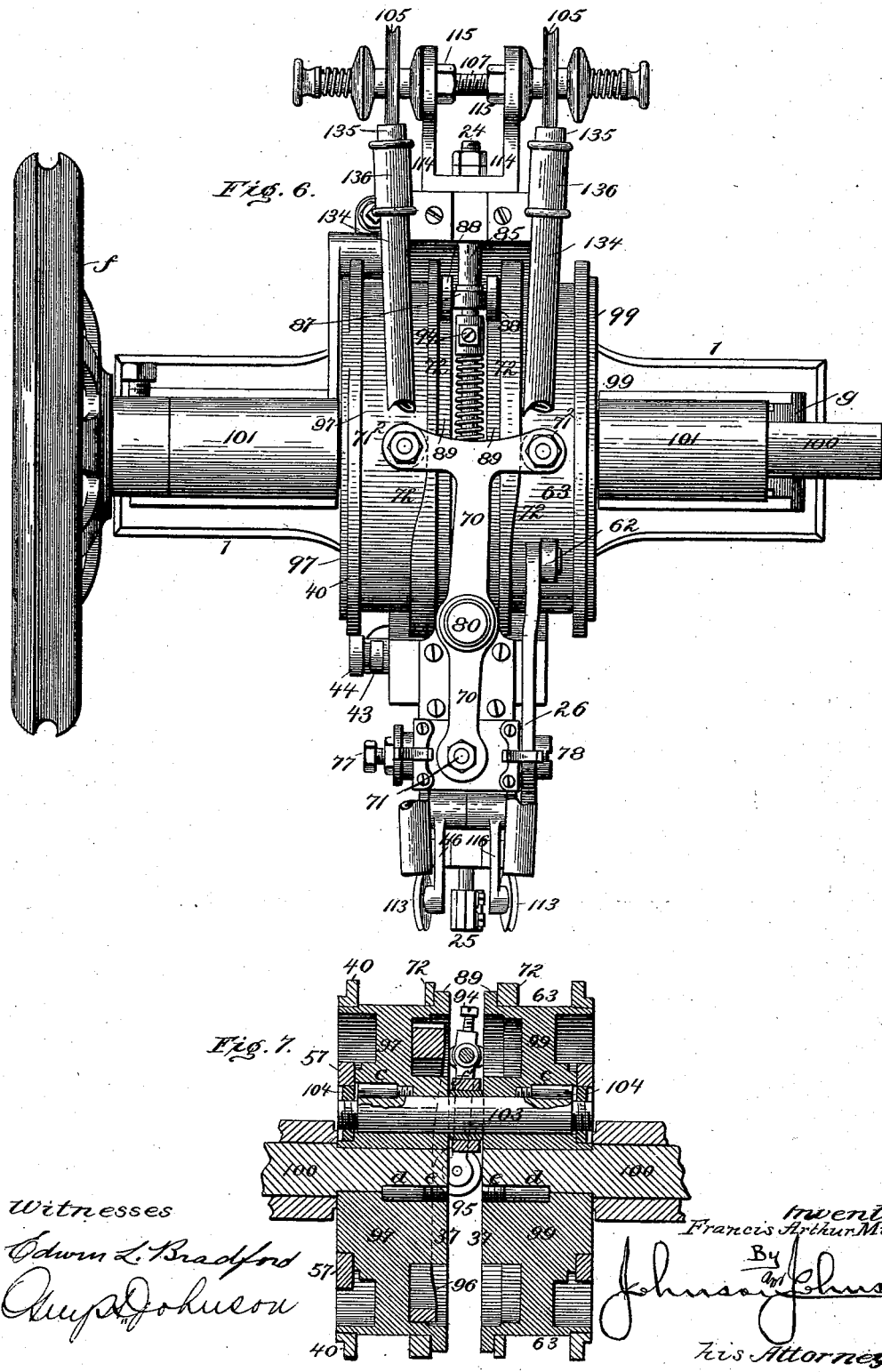

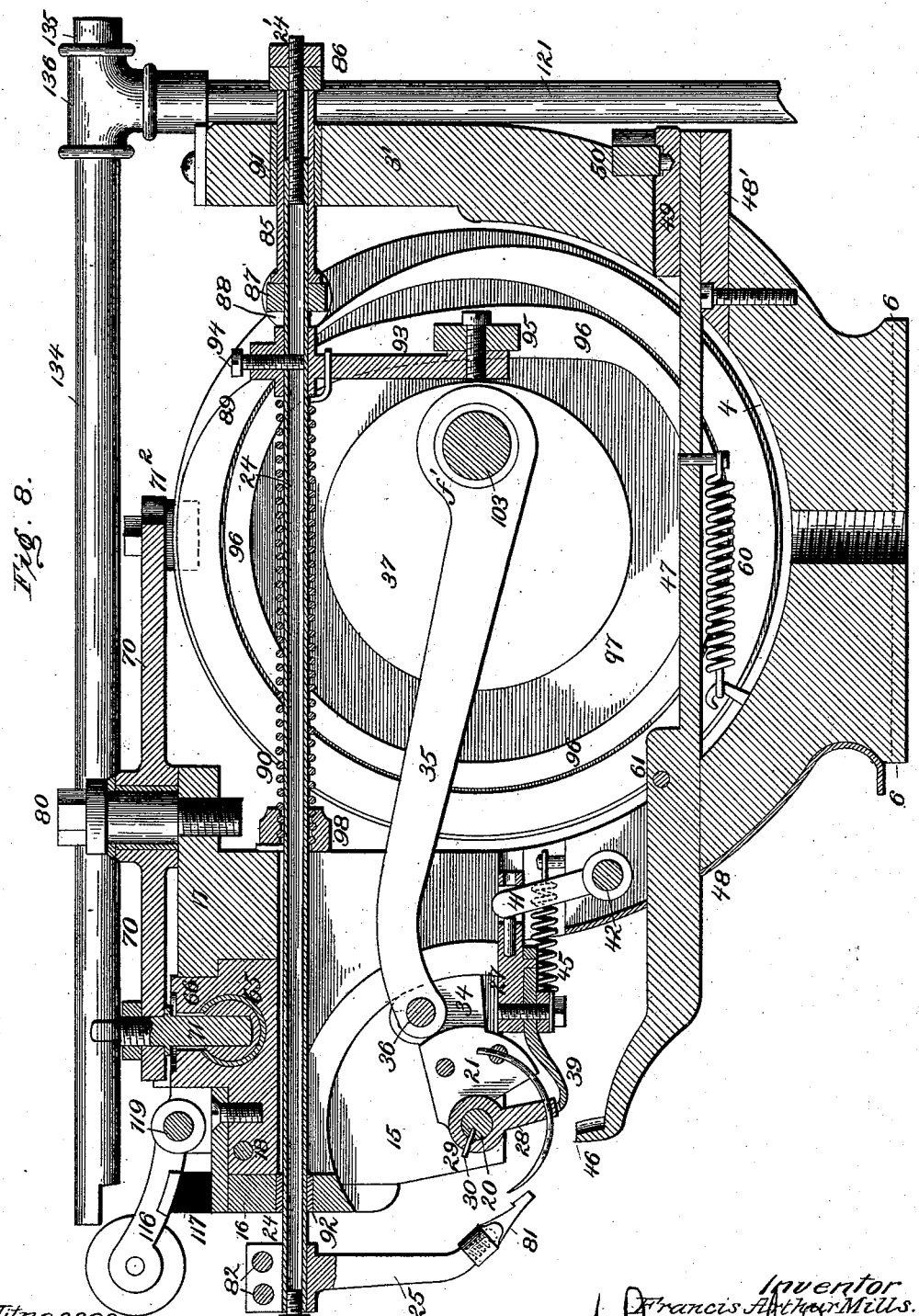

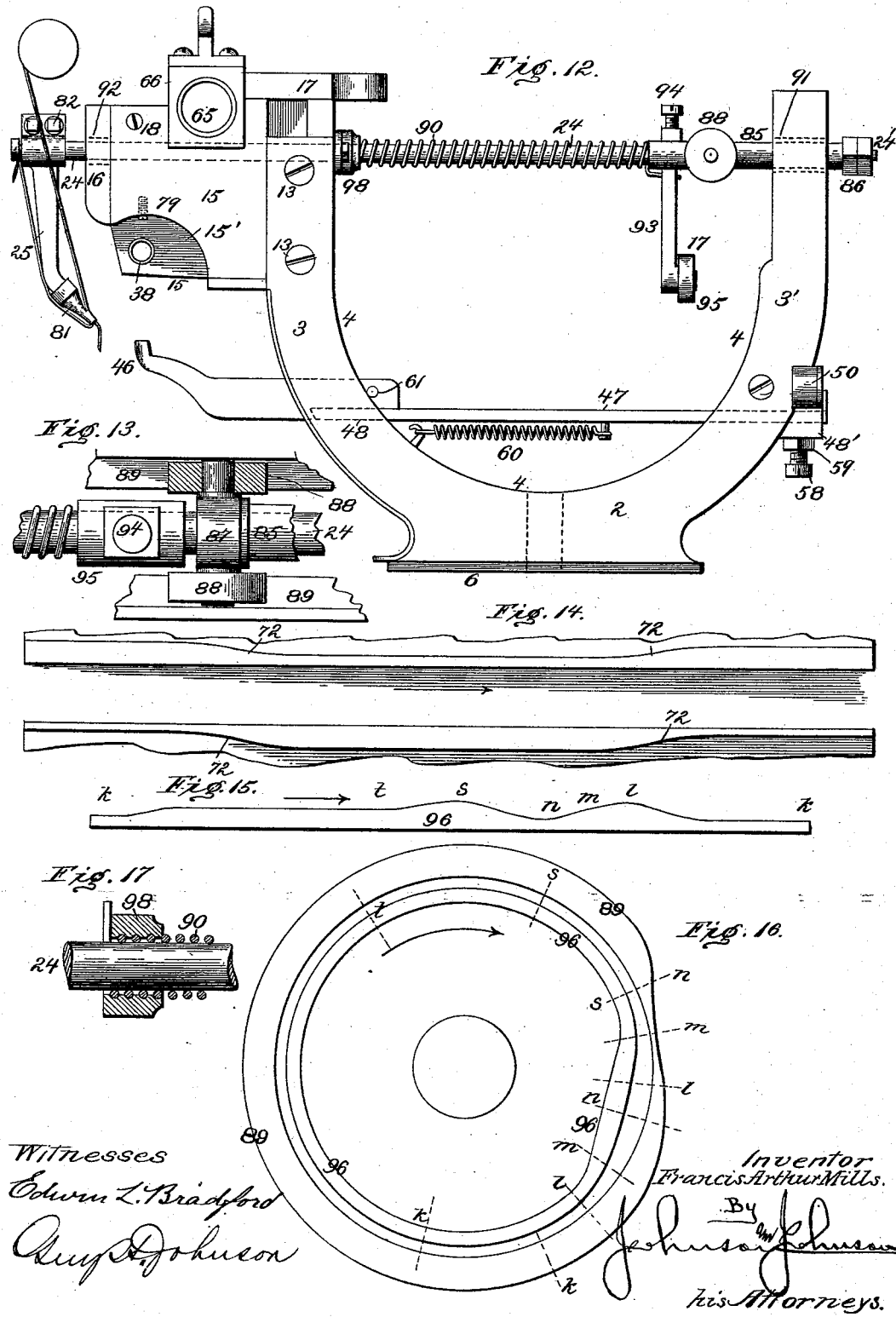

(No Model.)
F. A. MILLS.
SHOE SEWING MACHINE.
No. 524,336.  9 Sheets—Sheet 7.
Patented Aug. 14, 1894.
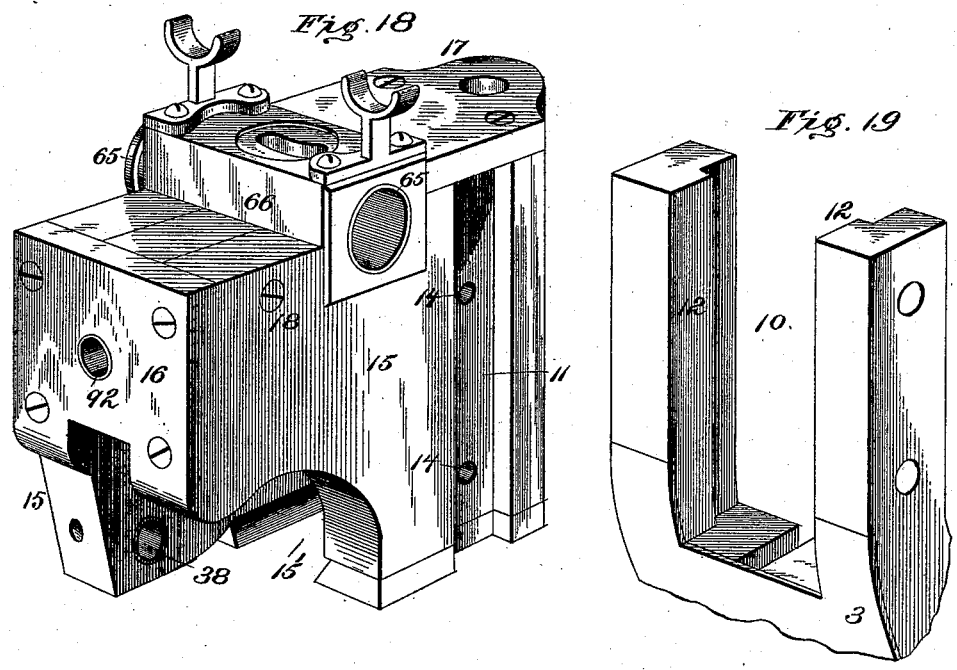
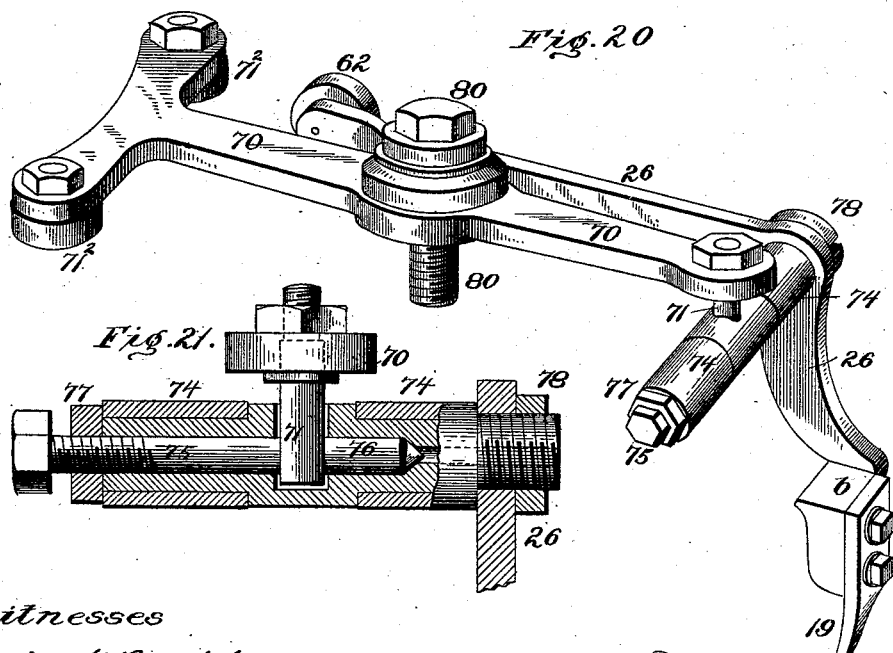
Witnesses
Edwin L. Bradford
Inventor
Francis Arthur Mills.
By Johnson & Johnson
his Attorneys (No Model.) 9 Sheets—Sheet 8.
F. A. MILLS.
SHOE SEWING MACHINE.
No. 524,336. Patented Aug. 14, 1894.
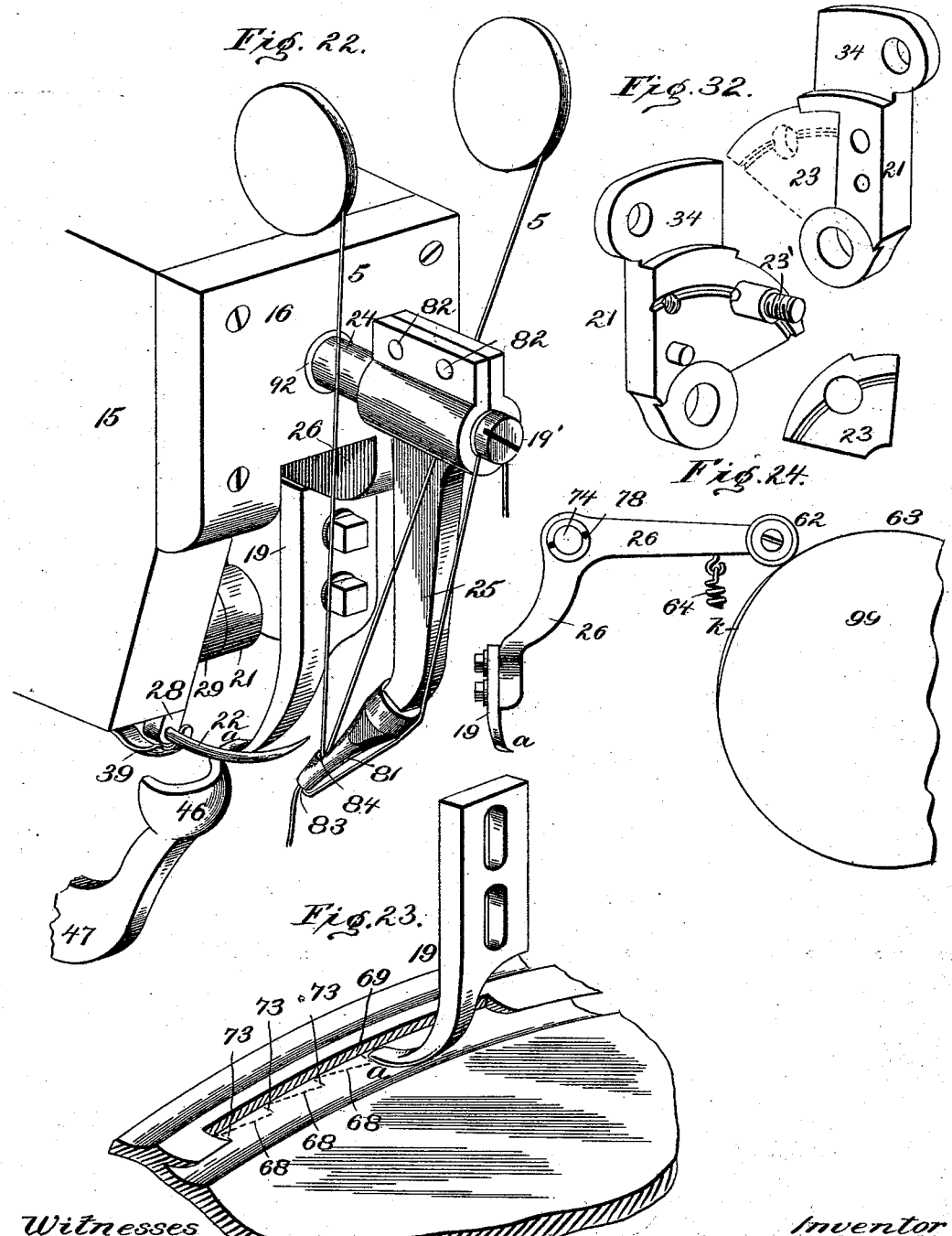
Witnesses
Edwin L. Bradford
Aug A Johnson
Inventor
Francis Arthur Mills
By Johnson and Johnson
His Attorneys.

(No Model.)
F. A. MILLS.
SHOE SEWING MACHINE.
No. 524,336.    Patented Aug. 14, 1894.
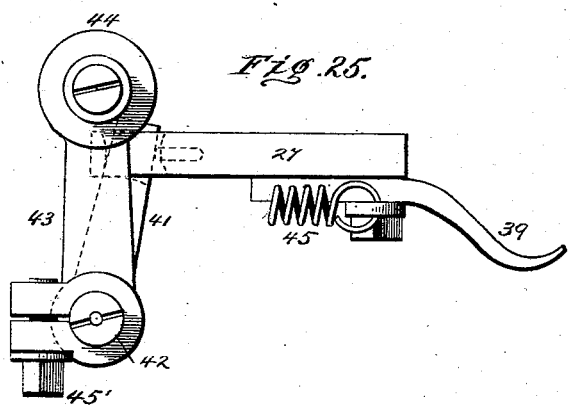
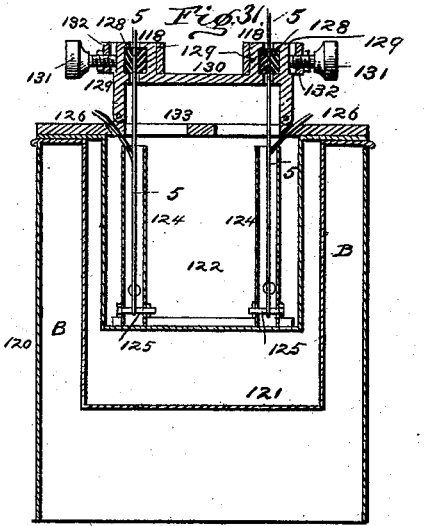
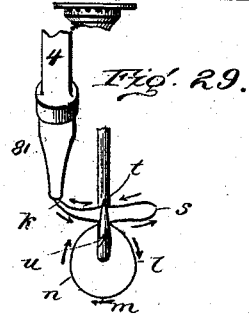
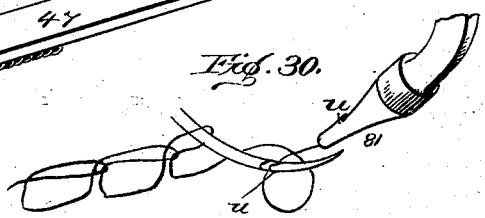
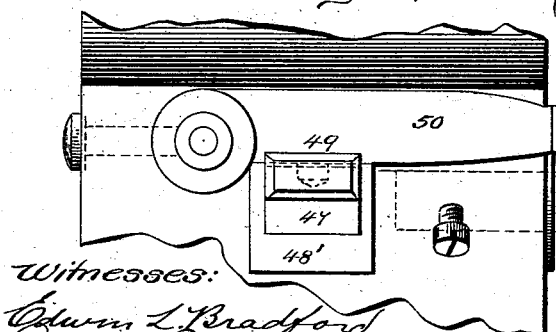
Witnesses:
Edwin L. Bradford
[signature]
Inventor
Francis Arthur Mills
By Johnson & Johnson
his Attorneys

UNITED STATES PATENT OFFICE.

FRANCIS ARTHUR MILLS, OF PHILADELPHIA, PENNSYLVANIA, ASSIGNOR, BY MESNE ASSIGNMENTS, OF ONE-HALF TO JAMES MUNDELL, OF SAME PLACE.

SHOE-SEWING MACHINE.

SPECIFICATION forming part of Letters Patent No. 524,336, dated August 14, 1894.

Application filed January 28, 1893. Renewed November 16, 1893. Serial No. 491,159. (No model.)

*To all whom it may concern:*

Be it known that I, FRANCIS ARTHUR MILLS, a citizen of the United States, and a resident of the city of Philadelphia, in the county of Philadelphia and State of Pennsylvania, have invented certain new and useful Improvements in Machines for Sewing Shoes, of which the following is a specification.

The invention herein is directed to improvements in sewing machines for shoes, wherein a curved barbed needle operates with a waxed thread; and my said improvements consist in certain novel parts and combinations of parts hereinafter specifically set forth in the claims concluding this specification. Before specifying such claims I will describe the machine illustrated in the accompanying drawings.

The following description read in connection with the drawings will enable any one skilled in the art to which my invention relates to understand its nature and to practice it in the form in which I prefer to employ it; but it will be understood that my invention is not limited to the precise form herein illustrated and described, as various modifications may be made without departing from its spirit and without exceeding the scope of the concluding claims.

Referring to the drawings: Figure 1 represents a vertical central section of a shoe sewing machine embodying my inventions, the needle being shown in the position it occupies in its full outward movement and the supporting devices locked in position to support the work as the loop is pulled and the stitch set. Fig. 1ª Sheet 1, is a horizontal section of the hollow standard showing its clamping construction for the revoluble member which contains the operating mechanism. Fig. 2 is an elevation of the right side of the same. Fig. 3 is an elevation of the left side of the same. Fig. 4 is a front view of the same. Fig. 5 is a rear view of the same. Fig. 5ª shows the sleeved tension wheel and the friction pads. Fig. 6 is a top view of the machine. Fig. 7 is an axial section of the cam cylinders showing their separate construction and connection by the pitman operating crank-pin for the needle carrier. Fig. 8 shows in enlarged vertical central section the center-head structure, the several devices contained therein occupying the positions shown in Fig. 1. Fig. 9 Sheet 1, shows the needle-carrier in side view; Fig. 10 a front view of the same; and Fig. 11 a top view of the same showing the end of its operating pitman-rod and the cheeks for the pivot bearing thereof. Fig. 12 shows the centerhead structure in elevation, the looper and the slide-rest devices therein; and Fig. 13 shows in top view the trunnion-rolls on the looper-rod and their relation to the cams which give the looper rod an inward movement. Fig. 14 shows the circumferential cams for the top feed-lever, developed in profile. Fig. 15 shows the face-cam developed in profile for operating the looper roll-arm. Fig. 16 shows the cams for operating the looper; and Fig. 17 shows the screw-box for fastening the looper rod spring to the sewing-head, as seen in Figs. 1 and 8. Fig. 18 shows the sewing-head structure; and Fig. 19 shows the bifurcated front pillar of the centerhead wherein the sewing-head is secured. Fig. 20 shows the compound feed-lever device; and Fig. 21 is a sectional view of the rocking and sliding pivot-pin for the feed-lever device. Fig. 22 shows in perspective a portion of the sewing-head and the work supporting and sewing parts illustrating the readiness for use of two separate and distinct threads for different stock. Fig. 23 shows the feed-arm in its relation to the shoe-channel and illustrating in dotted lines the oblique saw-tooth shaped movement of the feed-lip. Fig. 24 shows the feed device and its operating cam in side view. Fig. 25 shows a side view of the back-gage device. Fig. 26 shows a vertical section of the device for operating the back-gage. Fig. 27 shows the slide-rest. Fig. 28 shows an enlarged elevation of the locking device for the slide-rest. Fig. 29 illustrates the operation of the looper around the needle to form the loop and place the thread in the barb. Fig. 30 shows the thread as it is placed in the needle-barb in the operation of forming the loop-stitch. Fig. 31 shows in vertical section the waxing appliance for the two separate and distinct threads. Fig. 32, Sheet 8, shows the needle-carrier parts separated, the cap and the screw pin for securing the needle, and in which are seen the recessed ends of the carrier parts for forming the forks for the pivoted end of the pitman rod and for the eyed end of the needle guide.

The machine which I have improved is constructed to operate with a waxed thread and a curved barbed-needle for sewing turned or welted work. The sewing mechanism for this purpose is contained within a sewing-head structure and housing mounted upon a supporting structure in position for the presentation and manipulation of the work to devices for supporting and feeding it.

The supporting structure which I prefer to use has provision for adjusting the sewing-head structure to suit the height of the operator and for turning or swiveling it horizontally to allow him convenient access to every side of the machine. For this purpose I construct the standard A hollow and split its upper end at $a$ vertically at one side for about one foot. At each side of this split there is a strong lug $b$ Fig. 1$^a$ one of which is screw threaded and through which a screw-bolt $c$ passes to clamp the split parts together. The sewing machinery is mounted within and upon a housing structure, which is mounted upon a stem about six inches in diameter and about eighteen inches long, and formed with a strong circumferential screw-thread $d$ which fits snugly within the smooth walls of the split standard, so that the latter is firmly clamped upon the screw-stem when the sewing-head housing structure is adjusted. To support this housing structure upon the standard I provide a screw ring $e$, fitted upon the screw-stem, and resting upon the split end of the standard, which forms thereby the swivel support for the sewing machinery and is provided with arms $e'$ by which it is turned when it is desired to raise or lower the sewing-head structure. When so adjusted the split end of the standard is clamped upon the screw-stem and the sewing-head structure is prevented from turning. When the standard is unclamped the sewing-head structure is free to be turned horizontally by freeing the driving belt from the pulley $f$ of the operating shaft, which can be quickly done by a slight turning of the head to slacken the belt. The head can then be swiveled and raised and lowered for the purposes stated. In this way also the driving belt can be tightened when required. It will be understood that the screw ring $e$ maintains its seat upon the standard in swiveling and in adjusting the height of the sewing-head structure, and affords a firm and durable support for the working structure.

The structure which contains the sewing, work supporting and feeding mechanism, comprises a horizontal base-plate 1, a centerhead mounted at right angles thereon forming a bifurcated pillar 3 at its front and a pillar 3' at its rear ends, connected by a semi-circular wall 4 making an inverted arch open at its base or top and at each side Figs. 12 and 19 for the accommodation of cylinders having cams for operating the sewing and work supporting mechanism. The centerhead is firmly secured upon the base-plate Figs. 4 and 5 by means of a bottom dove-tail tongue 6 fitting in a corresponding groove 7 on the upper side of the base-plate and a center bolt 8 Fig. 1 passing through a transverse slot 9 in said base-plate into the solid base 2 of the centerhead, whereby the centerhead can be adjusted in relation to the crank operated pin 103 of the needle-carrier 21 to give the needle more or less front position with respect to the looper-finger 81 to give the proper relation to the needle's barb thereto.

The front pillar 3 of the centerhead has a rectangular vertical opening 10 Fig. 19 within which is mounted the sewing-head, which for this purpose has vertical co-incident recesses 11 Fig. 18 on each side fitting corresponding tongues 12 on the inner walls of the opening 10 in the centerhead, and when seated in place within the latter is secured by screw bolts 13 passing through the vertical sides of the centerhead and into threaded holes 14 in the sides of the sewing-head. This sewing-head is constructed of vertical side plates 15, secured together so as to leave an intervening space by a front plate 16 and a top plate 17 fastened together by a cross screw 18. The right vertical side plate is arched at its lower front corner to leave an open space 15' Fig. 18, within which the acting end 19 of the feed-lever works at the side of the head, Figs. 2 and 22, and which opening allows access to the needle-carrier. In the other vertical side plate the needle-carrier is loosely mounted upon a horizontal rocking pin 20, Fig. 10, (Sheet 1.) This carrier is formed of two like or matching plates 21, 21, to the inner side wall of one of which the curved-needle 22 is clamped by a cap 23, so as to extend to the front from the lower side of the carrier, which latter is arranged to operate between the sewing-head plates at the arched opening 15' at the side thereof, as seen in Figs. 2 and 8.

Referring to Fig. 32, Sheet 8, the plate parts 21 which form the needle-carrier, are each recessed on their meeting faces at each end so that when secured together these recesses form forks or bifurcations, as seen in Fig. 10, Sheet 1. Between the cheeks 34 formed by such fork at one end the pitman rod is pivoted in direct longitudinal line with the needle, and in a direct line with the thickness of the carrier, whereby the pitman-rod is connected to the carrier parts 21, and operates in a direct central line so that there is no sidewise strain or unequal wear on the carrier. The other of said forks receives the hub end 29 of the needle-guide 28 and as the latter is fast on the carrier pin 20 it thereby serves to hold the carrier so that it can have no sidewise movement on its pin and requires no other fastening to keep it truly seated on its pin. The cap 23 is fitted and secured to one of the carrier plates by the screw-pin 23 and clamp-nut and the needle is, by this cap, clamped to one of the carrier plates within grooves, by the screw-pin, through a diameter hole in which the needle passes in the usual way. A screw 23², Fig. 9, and a dowel-pin secure the carrier plates together.

Above the needle-carrier, the rod 24 which carries the looper-arm passes through and has a bushed bearing 92 in the front plate 16 of the sewing-head. Above this looper-rod at the right side of the sewing-head, is mounted the actuating lever 26 of the feed-device; while back of and below the needle-carrier the back-gage slide 27 is fitted within the slotted bottom of the sewing-head, see Fig. 26.

I make the needle-carrier of two plates to obtain a convenient construction for the mounting of the needle-guide 28 Fig. 10 between them upon the pivot-pin 20 of said carrier, upon which said needle-guide is fixed, while the needle-carrier is loosely mounted on said pin, so that the carrier and the needle-guide will operate together, and also independently of each other. For this purpose there is a space or fork between the pivot-bearing ends of the matching plates 21, 21, to receive the eyed end 29 of the needle-guide 28, which is pinned to the pivot by a pin 30, Figs. 8, 9 and 10, which projects so as to be struck by the needle-carrier at its bearing point when the top of the latter moves forward to give an inward movement to the needle-guide to follow the needle back in its function of bracing and guiding it. For keeping the needle-guide in proper relation to the barb of the needle, I fix an arm 31, Figs. 3 and 10 on the outer end of the pivot-pin 20 of the needle-carrier and connect said arm to a spring 32 which constantly tends to pull it back and the needle-guide forward so that as the carrier moves forward the guide arm will be free to move forward with it. Stop pins 33, Fig. 3, on the outer wall of the left plate of the sewing-head, act to limit the movement of the arm 31 and the needle-guide in proper relation to the barb of the needle.

The needle-carrier has cheeks 34, Figs. 8, 9 and 11, between which the crank operated pitman 35 is connected by the pin 36. These cheeks are fitted to move closely between the inner walls of the side plates 15 of the sewing-head and the latter thereby serve as guides for supporting the upper end of the needle carrier to prevent sidewise looseness in its motion, prevent undue strain upon the pivot 20 of said carrier, and give a firm movement to the needle in piercing the work. These cheeks also give a firm sidewise support to the connecting pitman-rod and cause it to have a direct central pull in the line of the needle, while the crank-pin connected end of the pitman is firmly supported sidewise between hubs 37, Figs. 7, and 8 of the cylinders, to which the crank-pin is fastened. This construction gives a direct, firm and easy movement to the pitman-rod and to the needle-carrier, renders them durable, easily put in place, and allows a renewal of the bearing of the carrier-pivot 20 by a bushing 38, Fig. 18, fitted in the sewing-head.

For supporting the edge of the sole at the point of stitching and clear of the point of the needle when feeding the work, I provide a back-gage 39, Figs. 8 and 25 carried by the slide 27 dovetailed in the bottom plate of the sewing-head Fig. 26. The back-gage is driven forward by a cam 40, Figs. 3, 4 and 6, in position to support the edge of the sole just before the needle moves forward to pierce the work. The slide 27 is slotted and is loosely connected by an arm 41, Fig. 26, standing up from a cross pin 42 having a long solid bearing in the centerhead and having an arm 43 on its outer end at the left side of the centerhead provided with a friction roll 44, which is actuated by the cam 40 to effect the positive forward movement and locking of the back-gage. The inward movement of the back-gage is effected by a spring or springs 45 connecting the slide and the centerhead. This positive forward movement of the back-gage is important because it serves to lock the gage when so moved so that the upper of the work can be held firmly against the shoulder of the sole, and the tension of the thread does not have to pull the upper against the shoulder. In sewing machines of this type so far as I know and can find this locking function of the back gage has been effected by the uncertain action of a spring and pawls, such uncertainty being due to the non-positive force of the spring and pawls, and the quick action of the needle which is thereby constantly liable to move in advance of the back-gage. When this occurs the needle will pierce too low into the upper to allow the latter to be drawn to the shoulder of the sole and this draws the upper in the shanks of the shoe so as to prevent a smooth setting and makes the shanks more or less irregular, because it requires a much greater tension of the thread in drawing the upper in the opposite side. Whereas by giving the back-gage a positive forward movement and a firm lock when so moved, it will always put the upper in its place before the needle pierces the upper, and hence the tension is made uniform and there is no unequal drawing of the upper at the shanks. This is particularly advantageous in sewing welted shoes. I provide for adjusting the back-gage so as to limit its distance from the feed-lip to suit the thickness of the material between the bottom of the channel and the edge of the sole and for giving a suitable clearance for the feed of the shoe between the feed-device and the back-gage when the shoe is being fed. This adjustment is made by setting the cam actuated arm 43, so that it will act to carry the back-gage more or less forward and this is attained by a clamp screw 45′, Fig. 25, passing through a split in the bearing end of said arm 43 so that the latter can be clamped at any point on the cross pin 42 which actuates the slide 27. The slide connected arm 41, Fig. 26, is screwed upon the pivot pin 42 against a shoulder which makes a convenient joining in the solid metal of the centerhead, which has a deep recess to receive the arm 41 and through which recess said pin passes.

While I have stated that the back-gage is locked by the cam 40 in position to support the work, I mean, by the word locked, that the cam operates to push the gage forward by a positive force and hold it. Such pushing action is made quick in its first movement and slowly as it comes in contact with the work, so as not to jar or knock the shoe, as would be the case by the sudden action of a spring and which is always liable to force the feed-lip through the between substance. This quick and slow movement of the back-gage is effected by the form of the cam as seen at $i$, $i^2$, $i^2$, in Fig. 3.

For supporting the lasted shoe in proper position to the sewing mechanism, I provide a slide-rest arranged below the back-gage and co-operating with it. Its acting end 46 stands vertically with a convex outer face just under the acting end of the back-gage, and curving downward and rearward terminates in a flat bar 47, Figs. 8 and 27, which is fitted to slide horizontally in guide ways 48 48' in the front and in the rear pillars of the centerhead, and in line with the line of movement of the needle, so that the line of pressure upon it is direct. Its front guide way 48 is preferably of an inverted T-shape, while the guideway for its inner end is formed in a box 48' fixed in the centerhead and open at its ends and top, Fig. 28. A friction clamp-block 49 is fitted to have a vertical movement within this box so as to act with a clamping and releasing action upon the flat end of the slide-rest 47 to lock it in a fixed relation to the centerhead when the needle draws the stitching inward so as to hold the slide-rest firm while the stitches are being drawn tight. This clamp-block is held in position upon the slide rest by a pressure lever 50 pivoted to the rear side of the centerhead at one side of the box, and crossing over the friction-block engages a cross groove, Figs. 8 and 28, therein so as to prevent the block moving with the slide-rest. The other end of this pressure lever extends beyond the left side of the centerhead and is constantly forced down by a spring 51 connected to the centerhead and adjusted to give the proper degree of pressure upon the lever 50 necessary to bind and lock the slide-rest. This adjustment is made by a tension-screw 52, Fig. 3, fitted in a fixed lug 53 at the top of the spring. To release the lock on the slide-rest I provide a lever 54 pivoted at 55 to the left side of the centerhead at a point just at one side of and below the free end of the pressure lever. This lever 54 extends frontward and has a friction roll 56 which engages a side face-cam 57, which is formed to both lock and release the slide-rest lever 50, as I shall presently state. The arrangement of the pivot 55 of this cam actuated lever 54 places the short end of said lever just under the free end of the pressure lever 50, so as to lift the latter by a screw 58 in the short end of said cam actuated lever, abutting against the under side of the free end of the pressure lever and thus when lifting the latter release the pressure of the friction-block 49 on the slide-rest and leave the latter free to be pushed back with the work. This screw 58 has a jam-nut 59 by which the bearing relation of the meeting ends of the two levers 50 and 54 can be adjusted to constantly maintain the contact of the pressure lever upon the cam-lever and the latter in contact with its actuating cam 57 and thus prevent lost motion. The guide box 48' is fitted and secured in a recess in the centerhead and the slide-rest is constantly pressed forward by a spring 60 Fig. 8, which allows it to yield when the shoe is being fed. The outward movement of the slide-rest is limited by a pin 61 therein abutting against the inner wall of the centerhead, Figs. 12 and 27.

The compound lever device for locking the slide-rest is such as to allow the cam actuated lever 54 to be constantly engaged with its cam and independent of the locking function of the pressure-lever. This allows the latter to be lifted by a free and easy movement of the cam lever because the latter has a very short lifting leverage and acts upon the free end of the pressure lever in vertical line with the tension spring. This arrangement of said lever and spring gives the advantage of placing the friction-block near the pivot-end of the pressure lever, and thus obtain great pressure by a comparatively light spring.

The device for feeding the shoe as seen in Figs. 2, 20, 23, and 24, consists of a lever 26 approximately L-shaped pivoted to the right side of the sewing-head at its top and carrying at its lower end an arm 19 which terminates in a lip $a$ standing toward the machine and adapted to enter the channel of the sole. The upper end of this lever has a friction roll 62 which is held down upon a circumferential cam 63 of a cam cylinder by a spring 64, Figs. 2 and 24 connected to the centerhead. The pivot-bearing of this lever is fixed to it, is of considerable diameter, and is fitted in a suitable bushed-bearing 65, in a box 66, Figs. 8 and 18 which is seated and secured between and within rectangular depressions in the top edges of the side plates 15, of the sewing-head by the screw 18, which binds said plates, and by the cap-plate 17 on the other side of said box. The intermittent rocking motion of this feed-lever imparts outward and inward movements to its feeding or lipped end. Simultaneously with the outward movement the feed-lever has imparted to it a lateral or sidewise movement on and with its pivot-pin, which, for that purpose, slides outward in its box, so that the two movements will describe a zig-zag path or line 68, like that of saw-teeth, as illustrated in Fig. 23. This oblique feed of the lip is outward from the bottom 69 of the channel toward the right. At the end of this oblique movement which is indicated by the dotted lines 68, the inward movement of the feed-lip is effected to cause it to engage the bottom of the channel 69 and after the stitch has been thoroughly pulled, the said lever is then caused to move back sidewise carrying its pivot-pin in its box, and thus moving the feed-lip to the left to feed the shoe for the next stitch. For effecting these lateral movements of the feed-lever, I provide a mechanism which consists of the lever 70 pivoted to the top plate of the sewing-head in the rear of the laterally sliding pin of the feed-lever, and connected at its front end to said sliding pin, by a vertical pin 71 Fig. 21 which fits into a hole in said sliding pin. As this sliding pin is fixed to the feed-lever and has a rocking motion with it, this hole is larger than the vertical pin 71 to accommodate said rocking movement. The two arms of this lever 70 have each a friction roll 71² which engage vertical face cams 72, 72, Figs. 6, 7, and 14, arranged on separate cam cylinders and which impart a horizontal vibratory movement to said lever 70, which thereby gives a sidewise movement of the pivot-pin 74 in its box 66 to move the lever 26 sidewise as stated. This compound movement of the feed-device is such that each complete movement of the feed-lever and its return movement for the next feed describes an acute angle, the apex 73 of which is the point at which the feed stroke terminates, as will be understood from Fig. 23. It is from this point 73 that the feed-lip describes its oblique path 68 to the point at which the said lip stops to make the short inward movement to the point from which it describes the base line of a right angled triangle, and this so far as I know and can find is a new and advantageous movement for a channel-feed.

The provision of two rolls and two separate cams for operating the lever 70 which gives the lateral movements to the channel lip a of the feed-device is important for operating said lever without lost motion and thus keep said lip always free of the path of the needle, and cause the feed-lip to act with precision in the channel. It is important also to observe that the oblique movement of the feed-lip gives a more gradual action to open the channel, freeing the lip completely from the bottom of the channel while making its return movement for the next feed and thus avoids much trouble which attends the replacing of the feed-lip in the channel. It also gives the advantage of sewing in channels of little depth and thin lips.

I make the lateral sliding pivot-pin, Figs. 8 and 21, of the feed-lever 26 about three inches long and seven eighths of an inch in diameter to give a sufficient bearing for the firm seating of the lever, and it may be constructed with steel bearing sleeves 74 fitted on each end so as to be renewed when worn. I may also provide this sliding pivot-pin with a central bore intersecting the side hole which receives the pin 71 of the top lever 70, and I place in this bore steel bearing pins 75 and 76, on each side of the pin 71 of said top lever. I make one of these bearing pins 75 in the form of a screw so that its adjustment against the said top lever pin 71 will take up any wear, and in this way the feed-lever can be maintained in perfect working fit. The adjusting screw has a jam-nut 77 which binds the sleeve and screw in place; while a nut 78 on the other end of the sliding pivot-pin serves to secure the feed-lever and bind the sleeve so that these two sleeves 74 form fixed parts of the pin.

An important advantage of the feed-device as I have described it is that it has but one wear joint and that is well protected from wear and from lost motion, and what wear may occur is taken up by an adjusting screw 79 Fig. 12, arranged in the arch of the sewing-head so as to form a stop against which the upper end b, Fig. 20, of the arm 19 which has the feed-lip, strikes, to prevent the latter from being forced up above the line of movement of the needle, and the bottom of the channel while pressing the work against the feed-lip.

The fulcrum pin 80 of the bifurcated lever 70 is screwed into the top plate of the sewing-head and has a bushed-bearing in the lever so that it can be replaced when necessary, as in Fig. 8.

I will now describe the mechanism for placing the thread in the barb of the needle and forming the loop around it. It consists of a swinging arm 25 mounted upon the front end of a horizontal rock rod or tube 24 which passes through the sewing-head between the cam cylinders and through the rear pillar of the centerhead so that it has bearings in the sewing-head and in the centerhead, and within which it has both a longitudinal and a rocking movement, as I will presently state. At its front end this rod projects from the sewing-head and has the swinging looper-arm which at its lower end has a looper-finger 81 standing at a downward incline toward the needle, and when in its normal position is to the extreme left of the line of movement of the needle, and the latter is at its extreme inward position. The upper end of the looper-arm is split and is clamped upon said rod by screws 82, see Fig. 22. The looper-finger is cylindrical, is screwed upon the arm, and has a central hole 83 which opens at its side 84 to receive and feed the thread. The other end of this rock-rod 24 projects beyond the center-head and terminates in a screw stem 24′, Fig. 8 on which a sleeve 85 is fitted between jamnuts 86 on the screw end and a trunnion-head 87 fitted loosely upon said rod and which has friction-rolls 88 which engage face cams 89 for forcing the looper inward Figs. 12 and 13. A spring 90 on this rod constantly tends to force the looper frontward and the provision of the jam-nuts 86 is for adjusting said rod to properly set the looper-finger in relation to the needle. In this adjustment the sleeve 85 abuts against the trunnion-head 87 and as its rolls 88 constantly bear upon their respective cams 89, Figs. 6 and 8, the jam-nuts therefore acting against the sleeve as a fixed point, will set the looper-finger and render the rolls self adjusting on their cams under the action of the spring. A bush-bearing 91 is provided at the rear side of the centerhead for this looper-rod and there is a similar bearing 92 for its front end, so that these bearings can be replaced when worn. An arm 93 depends from the rock-rod and is clamped to it by a screw 94, while its lower end has a friction-roll 95 which engages a ring-cam 96 on the inner vertical face of the left cylinder 97, whereby said arm is moved positively to rock the rod and vibrate the looper-arm to the right. The spring 90 has a fixed connection with the rock-rod or its roll-arm, its other end being screwed into a threaded box 98, Figs. 8 and 17 and clamped to the inner end of the sewing-head and its torsional force causes the looper-arm to vibrate to the left. The screw of the box engages the coils of the spring and holds it against the direct force and torsional strain caused by the longitudinal and rocking movements of the looper-rod and prevents the spring from having frictional contact with said rod, so that the conjoint action of the trunnion-head cams 89, the roll-arm-cam 93, and the rod spring 90 gives the required revolving motion to the looper-finger. The provision for adjusting the looper-rod serves also to adjust the roll-arm 93, so that it will not come in contact with the crank connected end of the pitman-rod. When the adjusting nuts 86 are turned to the left the spring sets the rock-rod and its looper-arm forward, and when these nuts are turned to the right the rock-rod and its looper-arm are moved back. This construction and the action of the spring renders the trunnion-rolls self adjusting in the line of the rod and upon their cams, and takes up any wear that may occur in the longitudinal movements of the looper-rod 24, or the side movements of the roll-arm 93. An important feature of this looper-rod and its coiled spring is the capacity of the looper-arm to yield while moving to the left, so that at any point in its movement to the left, the looper-arm is free to yield to avoid breaking the needle or bending the same by coming in contact therewith, which would be liable to occur should the needle pierce the sole low down and beyond the channel. In such event the yielding function of the looper-arm sidewise is permitted by the tension of the spring 90, and the latter thereby forms a cushion for the looper-arm and permits it to be arrested and yield in the contingency stated.

The provision which I have described for adjusting the looper-rod is important to keep the looper-finger in position to describe the circle of which the needle will always be the center, because the tendency of the wear is to allow the looper rod to work forward under the force of the spring, which, without being compensated for would in time cause the looper-finger to strike the needle.

Referring to the cam actuated rolls 88 on the rock-rod for giving the looper its inward movements I fit these rolls loosely on trunnions of the cross head and hold them in place by shoulders formed by the cams 72 see Figs. 6 and 13, on the cam-cylinders. This allows the rolls to be removed for replacement by new ones by pushing the rock-rod back to clear the rolls of the cam-shoulders.

As stated the needle-carrier is operated by a direct crank motion wherein the crank is mounted in separate cam-cylinders. These cam-cylinders 97 and 99, Fig. 7, are each fixed upon a separate shaft 100 which are mounted in separate standards 101 on the base-plate of the centerhead. The cam-cylinders are separated to permit of the rotary or crank movement of the pitman-rod between them and for access to the cams and mechanism when necessary.

The separate cam-cylinders each have a ring-cam on its outer side and on its circumference, and the left of said cylinders 97 has an inner side face-cam as I will presently describe. These cam-cylinders are united to each other by the crank-pin 103 of the pitman-rod, which pin has a screw thread on each end to receive countersunk nuts 104 on the outer sides of said cam-cylinders. The crank-pin is also keyed to the cylinders by means of screw pins c c; while the cam-cylinders are keyed to their respective shafts by means of key-pins d d and screws e e, which serve to hold the cam-cylinders fast on their respective shafts so that they can neither turn on or slide off their shafts. A sleeve f' on this crank-pin forms a bush-bearing for the pitman-rod and the sleeve ends abut against the inner hubbed sides 37 of said cylinders and thus prevent the sleeve from turning and avoid any binding action on the pitman-rod. The nuts 104 bind the cam-cylinders firmly against the bush-bearing f' and this bearing, the crank-pin and the cam-cylinders are united and rotate together with their separate supporting shafts, one of which has the belt-wheel. The separate shaft standards are fitted in recessed ways g, Fig. 5, on the base-plate and are secured and made adjustable by clamp-screws h so as to bring the cam-cylinders in equal relation to the opposite sides of the centerhead. In connection with this lateral adjustment of the cam-cylinders I provide for adjusting the centerhead at right angles to the line of the shafts by the slot 9 in the base-plate and the screw-bolt 8 Fig. 1 which secures the centerhead thereto. The object of this adjustment is to set the centerhead so that the needle shall have the proper relation to the looper, and in connection with the side adjustment of the cam-cylinders, give all the working parts a perfect central relation to each other.

Having described the construction and functions of the several operating devices of the organized machine I will now describe the means by which these devices are separately and conjointly operated.

As the needle-carrier is operated by its pitman-rod connection to move the needle forward, the back-gage is at the same time moved forward a little in advance of the needle in position to press the edge of the shoe-upper against the shoulder of the sole to hold them together while pulling the stitches. This movement of the back-gage is effected by a circumferential ring-cam 40, Fig. 3, which has a flattened surface $i$ of about one-fifth of the circumference, so that while this flattened part serves where it merges into the circumference of the ring to cause the back-gage to be moved in and out at the proper time, the concentric part 40 of said cam acts to lock the roll-arm 43 and its connected back-gage 39 in its supporting position while the stitch is being pulled in tightly. The important feature of this lock and its release is that it is made by a single ring-cam actuating a rock-arm. I also make this cam 40 to merge into the true circle gradually at $i^2\ i^2$, to cause it to give a gradual forward movement to the back-gage just before it comes in contact with the work and thus prevent all knocking action which would result from a sudden outward spring throw of said gage, and jar the shoe forward so that the feeding lip would be liable to cut through the bottom of the channel and destroy the sole.

Referring to Figs. 1 and 8, the back-gage, the needle, the slide-rest and the looper are shown at the limit of their outward movements, the slide-rest having been so moved by the spring 60 attached to the centerhead and to the inner end of the slide-rest, so as to constantly tend to move the latter forward to keep the shoe firmly pressed against the feed-device. When in this position the slide-rest is locked by the ring-cam 57 Fig. 3 on the outer side of the left cam-cylinder 97, which cam for about half its circumference is constructed at its lowest part $j$, Fig. 3, to allow the pressure lever 50 to apply and maintain the lock as stated while the stitch is being drawn tight. The other half of this cam has a greater concentric radius 57 to act upon and depress the roll-end of the lever to raise and release the pressure lever from the friction-block 49 and thus allow the free yielding action of the slide-rest to admit of the free feeding of the shoe between it and the lip of the feed-lever.

The lever of the feed-device has its compound movement effected as follows: The circumference of the right cylinder 99 has a slight depression $k$ Fig. 24, of about one-fifth of the same which gives the in and out movements to the acting end 19 of the feed-lever 26; while the remaining portion of this cam circumference 63 serves to hold the feed-lever-lip $a$ against the bottom 69 of the channel in the sole. A vertical face ring-cam 72 on each cylinder operates to vibrate the T-shaped lever 70 to move the feed-lever 26 sidewise to feed the shoe by the saw-tooth shaped movement of the acting end of the feed-lever which I have described. The cam 72 which gives the movement to feed the shoe, is on the right side cylinder 99, and has a curved surface projection 72, Fig. 14, about one-seventh of the circumference of the cam and acts to move the feed-lever the extent of the feed; while the cam 72 on the left side cylinder 97 is of identical construction and acts to move the feed-lever the distance to make the next feed of the shoe. It will be understood that as the feed-lever 26 is vibrated sidewise its friction-roll 62 slides on the surface of the cam 63 in an oblique path. I have planned all the cam movements so as not to exceed three-eighths of an inch throw which makes the machine easy running and almost noiseless and not so liable to get out of order, with comparatively little wear and having quick movements. I make these cams on rings to be easily seated, removed and replaced by new ones, while the cylinders on which they are seated, are arranged in the open arch-way space of the centerhead so as to receive between them the crank operated pitman, the looper carrying rod, and the slide-rest.

It is important to notice that the locking and releasing action of both the back-gage and the slide-rest, are effected by independent means, and this gives the advantage of maintaining the lock of the back-gage a longer time than that of the slide-rest for the purpose of keeping the shoe in its place until it is fed for the next stitch; whereas if both these devices were released at the same time the operator would have to guard against the displacement of the shoe from the feed-lip. For this purpose the slide-rest is locked at a point traversed by one half the revolution of its operating cam; while the back-gage is locked at a point about three-quarters of the revolution of its operating cam. It is also important to observe that the organization of the machine is such as to dispose the crank operated pitman-rod, the back-gage, the slide-rest, and the looper operating rod, in a vertical plane in the centerhead and thereby gives a compact relation of the parts and the advantage of operating the several devices in a direct longitudinal line in the structure, and the operator has thereby a free and clear front for swinging the shoe while sewing the shank.

The provisions which I have described for moving the looper-arm in and out are such as to cause its thread carrying finger to describe a half circle while moving outward and then a half circle while moving inward to complete its rotation around the needle to place the thread in its barb and this division of such movement in connection with its sidewise movement to form the loop, is very advantageous in preventing misthreading the barb of the needle.

The compound movements of the looper for describing a circular path to place the thread in the needle-barb in the formation of the loop, is effected as follows: The rod 24, which carries the looper 81 and the roll-arm 93, has a reciprocating and a rocking movement each effected simultaneously by the following mechanism: The reciprocating movement is effected by the circumferential cams 89, and the spring 90, the rocking movement of said looper-rod is effected by face cam 96 on the left cylinder and the said spring 90.

Referring to Figs. 15, 16, and 29 which illustrate the looping circle formed around the needle, and the cams for effecting the same and assuming the looper finger 81 to be at the starting point $k$ Fig. 29, which is its starting point in relation to the needle, the looper will be caused to describe a quarter-circle from $k$ to $l$ by means of the cams 96 moving the roll-arm 93 sidewise and by the action of the spring 90, moving the looper forward. From this point $l$ the looper continues to move to the front of the needle from $l$ to $m$ by the action of the said spring, and continues moving from $m$ to $n$ by the action of said spring and cams 89 and so on from $n$ to $s$ by the action of the cams 89 and cam 96, which completes the circle with respect to the needle and places the thread in its barb $u$. The course of the looper is now changed from $s$ to $t$ which latter letter is in line with the needle, and the looper remains in this position until the needle reaches its extreme backward movement. At this point the slide-rest is unlocked and the back-gage is being drawn inward. The feed-device now starts to feed the shoe and at the same instant the looper starts with the feed and traverses from $t$ to $k$ which completes the operation of the looping mechanism.

The path of the looper above described with reference to Fig. 29, can be read with the same letters of reference in Figs. 15 and 16 in relation to the roll-arm 93.

It will be understood that in these compound movements of the looper-rod, the spring 90 gives the looping device the forward movement to carry the looper outward, while the cams 89 act on the trunnion-rolls to draw it back positively. The roll-arm 93 is actuated by the same spring at the same time by torsion to rock the rod and move the looper to the left; while the cam 96 serves to rock the rod and move the roll-arm and looper positively to the right. This construction it will be seen provides for actuating the looper in two directions by one spring and a simple arrangement of cams upon separate cylinders for actuating the looper in two other directions, giving it an easy movement, provides for its wear and is practically composed of a compact device carried by a single rod.

The placing of the thread in the barb $u$ of the needle while moving inward and while the looper is at the same time moving from the point $n$ to $s$, prevents mislooping of the thread by reason of the joint action of the two movements of the looper and needle at the same time, the former from the left to the right and the needle inward. The object of having the looper move to the left at the same instant the feed device is moving to the left is to prevent the feed device from dragging or straining the thread as it is carried by the looper and to permit of a free and easy feed, because these two movements bring the devices together at the point to make the feed vices together at the same time and work together and with a uniform drawing action on the thread.

The tension device is adapted for two separate and distinct threads for independent use with a looper and a needle and the drawings illustrate the relation of these two threads with the looper which carries both in its looping finger but with one of such threads always hung up out of use. The tension device is mounted upon the rear of the machine and I have shown the two threads as being supplied from a waxing and heating device to the looper of a sewing machine.

The tension device Figs. 5, 5ª and 6 consists of a pair of wheels 105 arranged one above the other, each mounted loosely upon a horizontal shaft 107 fixed in a suitable bracket. Each friction wheel has a sleeve 108 which projects from the opposite sides of the wheel and has a disk 106, Fig. 5ª on each end which stands away from the wheel and engages a suitable friction surface such as felt 109, which forms the facing of a co-acting surface 110, and which latter has a spring 111 on said shaft to maintain the frictional contact of the disks. A nut 112 on the shaft serves to regulate the tension of the spring and the tension of the thread. The placing of the friction disks on the ends of the sleeves is to remove them from the tension wheel and thus prevent the friction-pads from being gummed with dripping wax which would to a great extent interfere with the proper tension and feed of the thread and give the operator much trouble: for in wax thread machines the tension wheels are kept hot from the thread as it comes from the hot wax-pot and the wax will gather on the wheels and run or drip over them upon the friction-pads so that the pads have to be removed and frequently replaced by new ones from this cause. The thread is wound once around each friction-wheel from the lower to the upper one from their rear peripheries and from the upper tension-wheel it passes over a cushioned guide-wheel 113 at the front of the machine to the looper. By using a pair of tension-wheels the pressure of the tension spring is about one half of what would be required for one tension-wheel, and this divided tension force prevents the slipping of the thread which occurs under the pulling action of the needle with one wheel adjusted to give the required tension. The slipping of the thread is attended with the objection of failing to put the proper tension in the stitches whenever the thread should slip. The thread is kept under proper tension as it is drawn from the wax-pot; while the cushioned guide-wheel maintains the proper tension of the thread as it passes to the looper. The important matter with the pair of wheels with the thread wound around them once as described, is that it allows only one half the full tension to be put upon each wheel by the thumb-screw and this permits the tension wheels to turn loosely on their shafts before the thread would slip, as the thread would have a greater friction on the wheel than the spring would put upon the felt. I secure the shafts of the tension-wheels to a bracket 114 by jam-nuts 115, so that the shafts cannot turn. To allow the thread to have a yielding feed to the looper the guide wheel 113 is mounted upon a pivoted arm 116 which rests upon a cushion 117. The thread passes to the tension device from a wax stripper 118 and is under a uniform tension at every point.

In sewing shoes of light and heavy stock it is the practice to change the thread to suit the different work and in doing this the thread must be cut at a point outside the wax-pot in order to join it with a lighter or with a heavier thread as may be required for the work. In doing this the cut part of the thread is tied to the end of the new thread and the latter is drawn through the machine and the cut part of the thread is thrown away. The time of the operator is lost in passing the new thread into the machine and adjusting the tension to suit the work. The handling of the thread smears the operator's hands with wax and this changing the threads is otherwise objectionable. To save all this trouble, loss of time and inconvenience I provide the machine with tension devices for two different threads suited for light and for heavy stock. For this purpose the tension device which I have described is duplicated so that each tension device has a pair of tension wheels, one above the other on separate shafts and the thread from each shaft is delivered over the machine at each side of the looper-arm. Both these threads are passed through the looper-bore where they are held for separate and independent use. The end of that thread which is not in use is held out of the way at the upper end of the looper-arm as seen in Figs. 1 and 22. The tension having been adjusted for the two threads for different work, they are always in readiness for use, require no changing and give a uniform tension for all work of the same class and this advantage is obtained by the employment of two independent and different threads each having an independent tension suited to the work. I use a single casting for this duplex tension device and bolt it to the back of the centerhead and I use separate cushioned arms for the front guide wheels, both mounted on the same pivot pin 119 which is mounted in a plate screwed upon the sewing-head.

The waxing and heating appliance is attached to the rear side of the centerhead and is adapted for waxing and heating the two separate and independent threads. It consists of a drum 120 open at its bottom and from its closed top depends a water chamber 121 and within this chamber the wax-pot 122 hangs within the water. A gas burner 123 under the open drum serves to heat the water chamber, the heat from which keeps the wax liquid. Two tubes 124 open at both ends are placed within the wax-pot and at its lower end each tube has a cross-pin 125 so that the separate threads from separate balls are passed down through separate top openings 126 into each tube around its bottom pin 125 and up through a wax-stripper to the tension device from which it passes into and through heating tubes 127 to the looper and to the needle. A wax-stripper Fig. 31 is placed over each opening through which the thread passes from the wax-pot and this stripper consists of two flat pieces of rubber 128 between which the thread passes and is stripped of its surplus wax. These rubber pieces are held between jaws 129, one of which is pivoted to a top housing 130 and is pressed with its rubber against the fixed rubber piece by a thumb screw 131 which passes through one end of an open box or band 132 which surrounds the jaws so that the screw bearing upon the pivoted jaw puts the proper pressure upon the strippers from which the thread is drawn with the proper tautness and properly waxed. These strippers are arranged in a housing fixed on a hinged cover 133 which is opened to supply wax to the pot.

Communicating with the hot air space of the heating drum are two tubes 127 which open into the separate horizontal branch tubes 134 which are open at both ends. The front ends of these top branch tubes terminate at the cushion guide wheels, while a screw plug 135 in the rear end of each has a hole large enough to allow the thread to pass through it from the top tension wheel. These pipes are thus made to form heating conduits for the two threads to keep them moist and soft as they pass to the needle. These top tubes have each a swiveling connection by a T-coupling 136 with the vertical branches which permits the top tubes to be turned out for access to the machine when required. It will be understood, however, that the tension device and the waxing and heating appliances are applicable to any shoe sewing machine designed for use with waxed threads, and in which the work is presented and manipulated to devices for supporting and for feeding the work.

It is evident that immaterial changes may be permitted from the general construction and arrangement of parts contributing toward my invention and for this reason I do not wish to be understood as limiting myself in precise detail and construction. It will also be understood that many of the devices above described are not all essential to the several features of my invention separately considered. This will be indicated in the concluding claims as in any given claim the omission of an element or the omission of reference to the particular features of the elements mentioned, is intended to be a formal declaration of the fact that the omitted elements or features are not essential to the invention therein covered.

I have illustrated in the drawings the invention claimed herein in connection with a complete shoe sewing machine, but as to all matters of devices and of the combinations of such devices embraced in said machine other than those which belong to and are covered by the invention claimed herein, they are embodied in separate and distinct applications Serial Nos. 491,160, 491,442, 490,965, 491,443, and 490,383 for patents filed by me, and are therefore not claimed herein.

Having described a machine for sewing shoes, embodying in preferred form the several features of my present invention in combination, what I separately claim, and desire to secure by Letters Patent, is—

1. In a shoe sewing machine, the needle-carrier formed of the joined plates 21, 21, and forked at each end, a pivot-pin on which said carrier is loosely mounted and a needle-guide fixed on said pivot-pin in the fork of the carrier to hold said needle guide in place, in combination with the pitman-rod connected in the other fork of the carrier, and suitable means for operating the needle-guide, substantially as described.

2. In a shoe sewing machine, the needle carrier mounted loosely upon its pivot pin in combination, with a needle guide fixed upon said pivot pin and having a stud on its pivot connected end for engagement with said carrier, an arm fixed on the end of said pivot pin, stops on a fixed part of the frame, a spring connecting said arm with the machine, and the crank operated pitman rod the said pivot-pin being also loosely mounted, for the purpose stated.

3. In a shoe sewing machine, the needle carrier forked at each end, fitted loosely upon a pivot pin, in combination with a needle guide fixed upon said pivot pin between the forked walls of said carrier to hold said needle guide in place, a crank operated pitman rod, fixed guide walls for the crank connected end of said needle carrier, and means for operating the needle guide, substantially as described.

4. In a shoe sewing machine, the sewing head structure constructed of side plates, one of which is arched at its lower front corner and forming interior guide walls, in combination, with the needle carrier mounted in the other side plate and fitted to work between said guide walls, whereby to permit access to the needle carrier and to give a firm lateral support to its crank connected end, substantially as described.

5. In a shoe sewing machine, the centerhead structure of open semi-circular form, a sewing head structure supported in overhanging relation at the front end of said centerhead, the feed lever device and the back gage mounted in said sewing head, and the slide rest mounted in said centerhead, in combination, with operating cam devices mounted in bearing supports independent of said centerhead and sewing head structures, substantially as described.

6. The sewing-head plates 15, 15 forming interior guide-walls, in combination with an oscillating needle-carrier and its pivot-pin 20, both mounted loosely, the needle-guide 28, fixed to said pivot-pin within a fork in the pivoted end of the carrier, and the crank-operated pitman-rod pivoted within a fork of said carrier, and means for operating said needle-guide, substantially as described.

7. In a shoe sewing machine, the combination, with the centerhead structure having its front end bifurcated and formed with vertical tongues, of a separate sewing head structure having side grooves corresponding with said centerhead tongues, the feed lever device, the looper device, the needle carrier, and the back gage arranged within said sewing head, and the slide rest arranged within the centerhead, for co-operative action, substantially as described.

8. In a shoe sewing machine, a semi circular centerhead structure and a separate sewing head structure mounted upon and overhanging the front end of said centerhead, in combination, with a looper device supported at one end in said sewing head, extending through the open body of the centerhead, supported in its rear side, and having a looper arm depending in front of the sewing head, a slide-rest extending through the open body of the centerhead and supported therein, the needle-carrier, the feed-lever device and the back-gage severally mounted in the sewing-head, and suitable operating mechanism for the several parts, substantially as described.

9. In a shoe sewing machine, the combination of the supporting stand comprising a lower fixed member and an upper vertically adjustable and swiveling member, with a centerhead containing the sewing mechanism and mounted upon the upper member of the stand, cam cylinders rotating within the centerhead, and pillar supports upon the swiveling member for said cam cylinders, whereby the centerhead may be properly aligned with said cam cylinders and the latter with the needle.

10. The combination, in a shoe sewing machine, of a centerhead comprising an inverted archway open at the top and forming front and rear pillars, a separate sewing head or housing mounted on said front pillar, the needle carrier and the back gage mounted in said sewing head, the looper device and the slide rest both arranged to cross the open archway, and separate cam cylinders arranged within said archway having the crank connecting pitman for the needle carrier between them and between the looper and the slide rest devices, and mechanism connecting said cam cylinders for operating the looper, the work supporting and the feeding devices, substantially as described.

11. In a shoe sewing machine, the combination with the sewing head, and a centerhead forming an inverted archway open at the top, of a back gage, a spring 45 connecting it with said sewing head, a cam cylinder arranged in the centerhead archway, and a device connecting the back-gage and the cam cylinder consisting of a rocking pin 42 having an arm 41 connecting the back gage and an arm 43 having a roll 44 connecting the said cam cylinder, whereby the back gage is operated and locked by rigid connections.

12. The combination of a centerhead forming an inverted archway, and a sewing head mounted in overhanging relation at the front thereof, of separated cam cylinders arranged in the centerhead archway and connected by a crank pin, a needle carrier, its crank connected pitman rod between said cams, the back gage, the slide rest, and the feed device, mechanism between the cam cylinders for operating the looper device, mechanism at the top of the sewing head for operating the feed device, mechanism at the side of the centerhead for operating and locking the back gage, and mechanism at the rear of the centerhead for locking the slide rest, substantially as described.

13. The combination, with the centerhead structure containing the sewing mechanism, of the separated cam cylinders mounted on independent shafts at each side of said centerhead, a crank pin connecting said cylinders, the needle operating pitman rod between said cylinders, and means for removably securing said crank pin to said cylinders, substantially as described.

14. A structure for shoe sewing machines, comprising an inverted arch having a flat base open at its top, and a separate housing overhanging the front arch wall, in combination, with a looper arm overhanging the front housing, and mechanism for operating it arranged within the archway, substantially as described.

15. The centerhead head structure herein described comprising an inverted arch having a flat base and open at its top and a separate housing overhanging the front arch wall for containing sewing mechanism, arranged as shown and described.

In testimony whereof I have hereunto signed this specification in the presence of witnesses.

FRANCIS ARTHUR MILLS.

Witnesses:
A. E. H. JOHNSON,
PHILIP F. LARNER.